MECHANICAL SERVO TONE ARM

Filed April 29, 1963 2 Sheets-Sheet 1

INVENTOR
Jacob Rabinow

BY Joseph A. Genovese & Max L. Libman

ATTORNEYS

May 3, 1966 J. RABINOW 3,249,361

MECHANICAL SERVO TONE ARM

Filed April 29, 1963 2 Sheets-Sheet 2

INVENTOR

Jacob Rabinow

BY Joseph A. Genovese & Max L. Libman

ATTORNEYS

United States Patent Office 3,249,361

Patented May 3, 1966

3,249,361

MECHANICAL SERVO TONE ARM

Jacob Rabinow, 6920 Selkirk Drive, Bethesda, Md.

Filed Apr. 29, 1963, Ser. No. 276,468
6 Claims. (Cl. 274—23)

This invention relates to phonographs, and particularly to phonograph tone arm assemblies.

Most record players have tone arms mounted for horizontal swinging movement about a vertical pivot axis located beyond the rim of the turntable. Accordingly, the stylus-end of the tone arm describes an arc as it tracks the record groove with the result that the tone arm is tangent to the groove for a minimal portion of the tracking. The lack of tangency between the stylus and record groove gives rise to tracking distortions and undesirable stylus-to-groove side pressures. These conditions are undesirable in playing monaural records, but are especially undesirable when playing stereo records containing separate audio channels on opposite sides of the record grooves. The reason is that not only are distortions introduced, but audio balance is disturbed due to the unbalanced side pressures. As will be discussed below, this problem has been previously dealt with in the most common type of tone arm used at the present time.

Most record players use a so called off-set arm. This is a rigid arm, pivoted vertically at approximately 7 to 10 inches from the center of the record, and carrying the transducer (commonly called the pick-up) in a manner such that the center line of the pick-up is at an angle to the line connecting the vertical pivot and the stylus tip. By proper proportioning this off-set angle relative to the length of the arm and the point at which the pivot is mounted, the tracking angle can be kept at a very low value with a reasonably long arm. In good designs, the tracking angle can be kept at about one degree or less. As far as tracking angle is concerned, the off-set arm seems to satisfy the criterion for a good pick-up mounting. Unfortunately the off-set arm suffers from a very grave difficulty in that side pressures are generated on the inner side of the stylus because of the frictional force (called "skating force" in the article identified below) between the stylus and the walls of the groove of the record. Even if the frictional force were zero, there would still be a drag force because of the modulations of the groove and the acoustic impedance of the stylus. An analysis of this difficulty and the distortion that it produces can be found in an article by George Alexandrovich in the Journal of the Audio Engineering Society, April 1961, and in a technical paper on this subject presented at the 1960 convention to that society.

In order to obviate this difficulty, the servo phonograph arm assembly disclosed in my Patent No. 2,915,315 moves in a straight line and always remains substantially tangent to the record groove being tracked. The thing that is important in the proper mounting of a pick up is that not only must the pick up be tangent to the groove at all times, but also that the free pivot point about which the pick up rotates must also lie on the center line of the pick up; in other words, in the same tangent line. If this criterion is met, there will be no tendency for the pick up to jump the groove because of the constant bias caused by the off-set; and the only side pressures are those due to sound modulation and normal eccentricity of the record. It should further be noted that small angular deviations from tangency (called "skew" herein for lack of a better term) are not important because the side pressures are sine functions of the angle. Thus, for small angles, like one degree, these forces are negligible.

Prior attempts have been made to move the pick up and its support in a straight line along various track-type mountings without a servo. But when this is done, the total inertia of the arm and its support (usually including a carriage) becomes part of the arm resonance system and is far too large for any modern pick up. In the embodiments which I show herein and in my Patent No. 2,915,315, the mass of the arm system affecting the stylus is kept to a minimum. That is, I use a normally pivoted arm with a counter-weight close to the pivot so that the moment of inertia of the arm is kept to a minimum, as is done in all high quality tone arms today.

A number of tone arm assemblies constructed under my Patent No. 2,915,315 were considered to be highly satisfactory. Among other reasons for the importance of the servo feature disclosed in the above patent, are the overcoming of problems originating from differences in groove pitch, groove eccentricity, friction in the arm support, and electrical cable stiffness. However, to attain the excellence sought in the tone arm assembly electrical noise of the switches used as a part of the servo must be carefully suppressed. In the development of these tone arms, I built several photocells and light sources as switches, but this leads to additional expense for the photocells, their amplifiers, lights and their mountings, relays for the motor-control signals, etc.

It occurred to me that a wholly mechanical system having a performance at least equal to that disclosed in the above patent would yield significant benefits. Such a tone arm assembly would inherently be less expensive and would have no electrical noise and hum problems. Furthermore, I would have no electrical leads to contend with, other than those required for the pick up.

Accordingly, an object of my invention is to provide a tone arm assembly with a mechanical servo of the type which senses incipient deviation from tone arm-to-groove tangency and provides a servo correction to eliminate stylus side pressures while tracking the record groove. My invention can achieve this objective when it is used with any tone arm assembly where the stylus path is such as to maintain substantial tangency to the groove as the record is played. However, for simplicity I shall discuss a tone arm assembly which is constrained to move in a straight line horizontally through the center of the record, i.e. like in my Patent No. 2,915,315.

Accordingly, in the illustrated forms of my invention I have a movable tone arm support, e.g. a carriage constrained to straight line motion. The tone arm mount allows the arm to pivot in a vertical plane (assuming the turntable to be horizontal) and to make excursions in the horizontal plane while the stylus tracks the record groove. A motor is arranged (preferably on the carriage) to propel the carriage in the record playing mode. The horizontal motion of the stylus during tracking is in a straight line perpendicular to the portion of the record groove being tracked.

In my present invention the above motor is mechanical, for example, a spring motor. By using a mechanical servo speed-control, operated by horizontal motion of the arm, the arm holds back the motor speed to the value necessary for accurate tracking. My mechanical servo is arranged to detect horizontal excursions of the arm (called "skew") as the arm-supporting carriage is horizontally propelled by the spring motor. The skew detection is used to slow or stop the horizontal motion of the carriage (and consequently the bearing-end of the tone arm). Thus, during carriage motion, when a very slight skew begin to occur, my servo mechanism compensates the skew by changing the speed of the carriage. By deliberately designing a slight lead angle (skew) in my mechanism, fixed velocity error for the servo mechanism can be eliminated.

Another object of my invention is to provide a tone arm assembly constructed along the lines described above.

A feature of my invention is found in the various brake mechanisms used for slowing and speeding up the carriage as a servo function. Obviously, tone arm assemblies will not tolerate mechanical shocks and jars during their operation, and my brakes are designed with this in mind. In one form of brake I use a rotary element which is driven by the mechanical motor, preferably through a gear train so that the element rotates with low torque. A surface which is stationary with respect to the rotary element and carriage, is located adjacent to the rotating element and is co-cylindrical therewith. A member, e.g. a friction wheel, is attached in a manner to move with the horizontal motions of the tone arm with respect to the carriage, for instance the friction wheel can be secured to the vertical pivot of the tone arm.

Accordingly, as the pick up traverses the record, the arm develops a small angle from its normal position perpendicular to the track which supports the tone arm carriage. This causes the friction wheel to move from the rotating element onto the stationary surface. This acts as a brake release on the spring motor causing the latter to turn and move the carriage. When this happens the friction wheel rolls back onto the rotating member slowing the spring motor. This action of the brake wheel acts, then as a speed control for the carriage, making the carriage travel at the correct speed to keep the arm tangent at all times to the record groove. The action of the friction wheel is such that it acts a continuous rather than a step speed-control, and if it were not for the normal oscillation and eccentricities of the record, the speed of the spring motor would be substantially constant for a constant pitch record groove. In practice because of groove eccentricities, the carriage speed is not constant, but the motion is so slow that any errors introduced into the tangency are negligible.

It should be noted that the friction forces on the wheel can be resolved into two components, one which produces rotation of the wheel and one which produces axial force on its bearings. The wheel is free to rotate so that the rotary forces produce no reaction. The axial forces, however, do produce an action on the arm but these forces are absorbed by the pivot bearings and they do not produce rotary forces on the tone arm.

Other forms of my brake rely on the same concept of a low torque rotary member driven by the spring motor, and the minimizing of mechanical brake-reaction from the tone arm.

Accordingly, a further object of my invention is to provide a tone arm with servo having unique breaking means responsive to tone arm skew for exercising the servo control function.

Other objects and features of importance will become apparent in following the description of the illustrated forms of the invention which are given by way of example.

Figure 1:
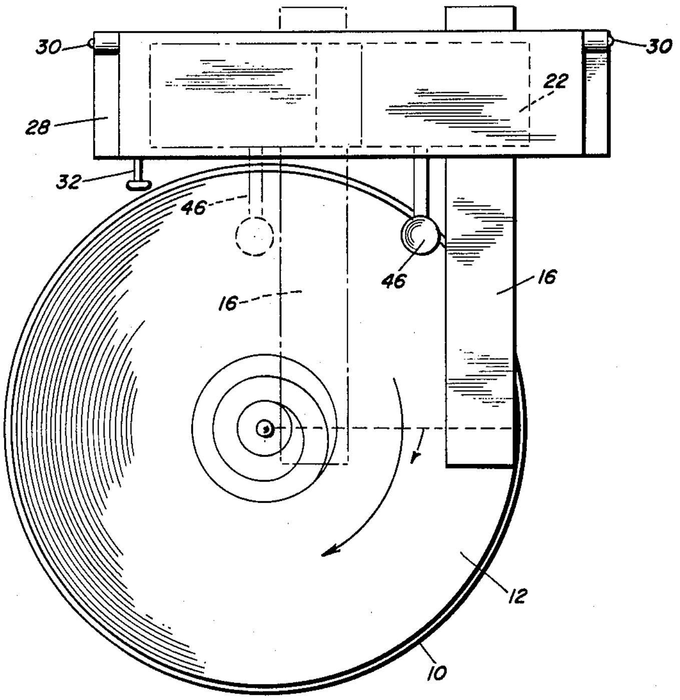
FIGURE 1 is a top view of a tone arm assembly embodying the invention.

In the drawings, the turntable 10, spiral-groove record 12, and motor 14 for the turntable are conventional. My tone arm assembly (FIGURE 1) is mounted adjacent to the rim of the turntable, however, to conserve space the assembly can be mounted above the turntable (along a chord thereof). When so mounted, tone arm 16 must be shorter to require stylus 18 to track along radius "*r*" (FIGURE 1) of the record.

Figure 2:
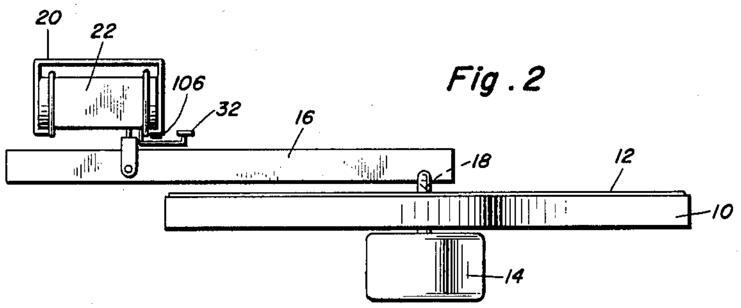
FIGURE 2 is a partially sectional and partially elevational view of the assembly in FIGURE 1, parts being omitted for clarity.
Figure 3:
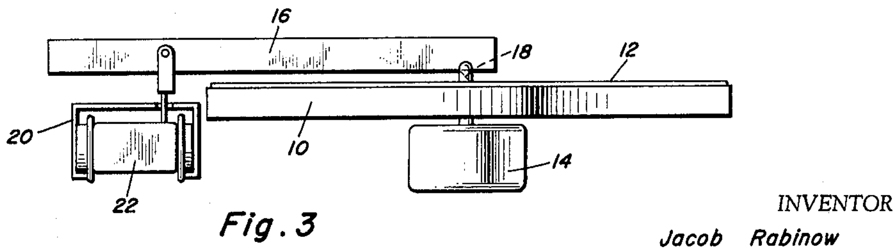
FIGURE 3 is a sectional view like that of FIGURE 2 but showing a modification of the arrangement of the tone arm assembly with respect to the turntable.
Figures 4, 5, 6, 7, 8, 9, 10:
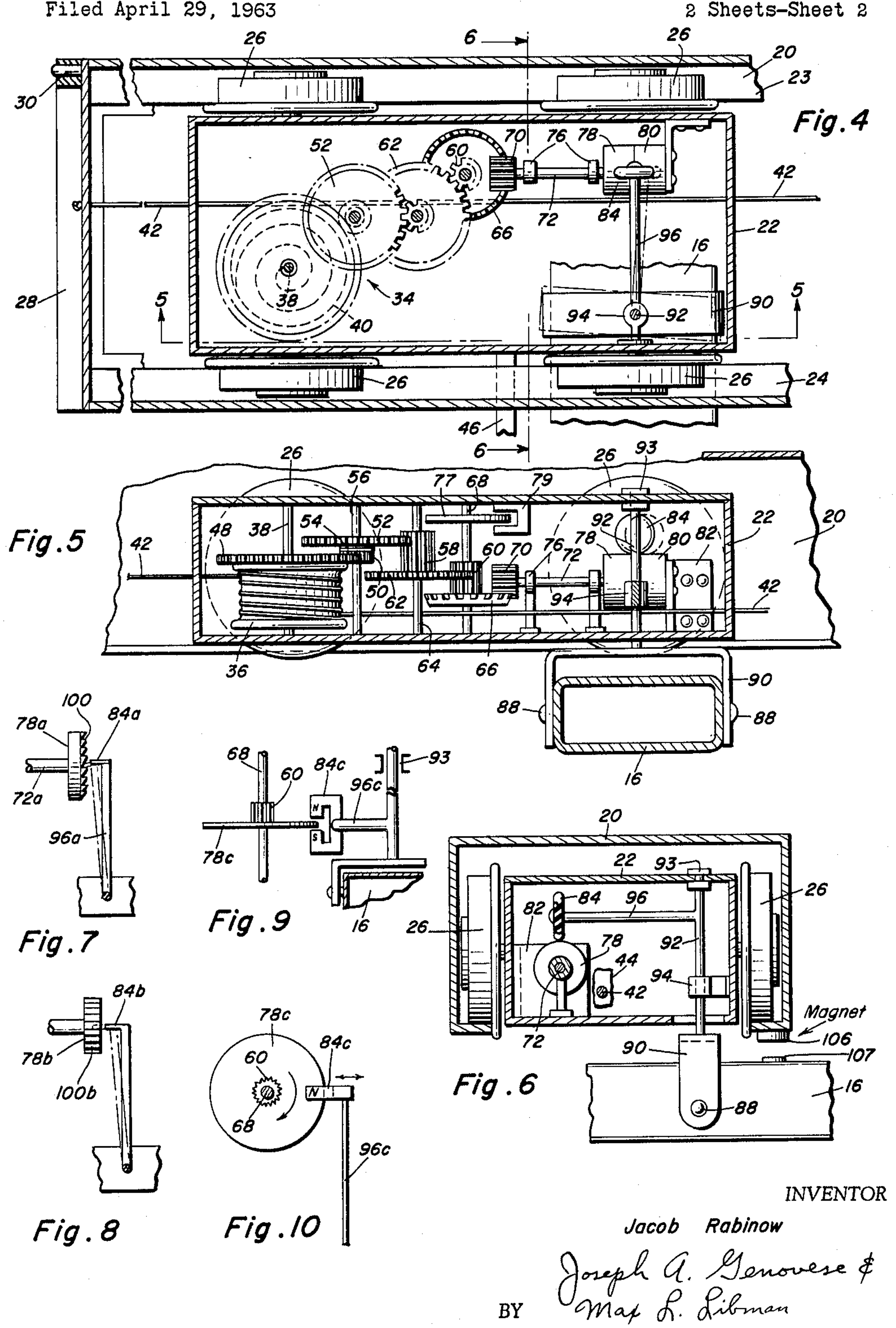
FIGURE 4 is a fragmentary horizontal sectional view of my assembly.
FIGURE 5 is a sectional view taken on line 5—5 of FIGURE 4.
FIGURE 6 is a transverse sectional view taken on line 6—6 of FIGURE 4.
FIGURE 7 is a diagrammatic view showing a modification of the brake which forms a part of my assembly.
FIGURE 8 is a diagrammatic view showing another modification of the brake.
FIGURE 9 is a diagrammatic side view showing an eddy current brake constituting another modification.
FIGURE 10 is a top view of the eddy current brake of FIGURE 9.

The tone arm assembly consists of a guide 20 which constrains the motion of support 22 which tone arm 16 is pivotally attached. The structural details of the guide and support are relatively unimportant. For instance, guide 20 can be made of a channel or box beam member with a lower slot (FIGURE 2) and/or an upper slot (FIGURE 3) affording parallel rails 23, 24 for wheels 26 of the tone arm-support 22. In some instances it may be desirable to lift the tone arm, its support 22 and rails 23, 24 upwardly to facilitate record changing. Thus, the mount for guide 10 can be made of a pair of end-brackets of a subframe 28 to which guide 20 is pivotally attached, e.g. by pivots 30 (FIGURES 1 and 4). Lift handle 32 (FIGURE 1) is attached to guide 20 as a convenience. In mounting guide 20 it is important that its longitudinal center line be parallel to the desired stylus path "*r*" (FIGURE 1) i.e. a straight line from the edge of the record through its center. Obviously, support 22 and its guide 20 can be mounted above (FIGURE 2) or below (FIGURE 3) the turntable to reduce the height requirements of the tone arm assembly.

Support 22 is shown as a carriage, and it can be constructed in many ways. For compactness I have illustrated a rectagular casing which contains mechanical motor 34, a brake, and the various necessary bearings. The bearings are only schematically shown in the interest of simplicity. The carriage dimensions are such that the flanges of wheels 26 at the sides of the carriage constrain the carriage to straight-line motion by engaging the inner edges of the rails (FIGURE 6).

Motor 34 is a mechanical spring motor made of drum 36 (FIGURE 5) mounted for rotation on vertical stationary spindle 38 attached to the top and bottom walls of carriage 22. Torsion spring 40 is mounted in a cavity in drum 36 and has one end secured to spindle 38 and the other end to the drum. Flexible elongate member 42, for instance a thin narrow belt, cable or cord, is wound around drum 36 and the ends extend through openings 44 (FIGURE 6) in the end walls of the carriage. The extremities of member 42 are secured to the opposite ends of guide 20 (FIGURE 4). Accordingly, when carriage 22 is moved to the right, for example by manually moving the carriage-attached handle 46 (FIGURES 1 and 4) to the right, member 42 rotates drum 36 in a direction to wind spring 40. In this manner potential energy is stored in the spring 40, and it can be expended to move the carriage to the left (FIGURE 1) while the tone arm tracks the record. Specifically, as spring 40 unwinds, flexible member 42 is concurrently wound on and paid out from the drum thereby causing carriage 22 to move on the rails of guide 20 in a path parallel to radius "*r*."

I have a uni-directional servo to assure that as the carriage moves from right to left (FIGURE 1) the speed is continually adjusted to eliminate tracking errors. However, as the carriage is moved manually from the center of the record to the right, the servo is overriden. Clutch 54 in the following gear train is responsible for this. The gear train (FIGURES 4 and 5) is driven by spring 40 but is overriden when the carriage is manually moved.

Gear 48 of the gear train is fixed to drum 36 and engaged with pinion 50 which is coupled to gear 52 by means of the clutch 54. The clutch, pinion 50 and gear 52 are mounted for rotation on a vertical spindle within carriage 22. Pinion 58 is enmeshed with gear 52 and is coupled to pinion 60 by means of gear 62 which is attached to pinion 18 on shaft 64. Crown gear 66 is attached to pinion 60 and both crown gear 66 and pinion 60 are secured to shaft 68. Pinion 70 on shaft 72 is enmeshed with crown gear 66. Shaft 72 is mounted by conventional bearings 76, and a brake element 78 is fixed to shaft 72. Thus, the brake element 78 rotates with low torque due to the gear train drive connection with the spring-operated drum 36. When carriage 22 is propelled by spring 40 (in the record playing mode) clutch 54 does not slip. However, when the carriage is moved with much greater force from the center of the record to the outer edge of the turntable (motor winding mode) the flexible member 42 causes the drum 36 to turn and the spring 40 to wind while clutch 54 can slip.

Although not essential, it is desirable for the mechanical spring motor to have a speed governor. A metal disc 77 attached to shaft 68 and rotating in the space between the poles of fixed magnet 79 forms a satisfactory governor. However, I could have easily used a liquid governor on shaft 68, an air vane, or an escapement which are, for these purposes, equivalent.

The brake element 78 mentioned before, is a part of a brake which is actuated in response to skew of the tone arm, which is discussed later. In one form (FIGURES 4–6) of brake, brake element 78 is cylindrical and is located adjacent to a stationary cylindrical surface 80. Surface 80 is held fixed with respect to carriage 22 by bracket 82. Wheel 84 is mounted to roll between full and dotted line position (motions shown exaggerated in FIGURE 4) at which the surface of the wheel respectively engages and disengages brake element 78. Thus, the mechanical motor is allowed to operate when wheel 84 is in the dotted line position, but is slowed or stopped when wheel 84 engages brake member 28. Spring 40 and the gear train are designed to slightly overdrive carriage 28 during the record-playing mode which, with my brake, requires carriage 22 to drive the tone arm 16 to maintain tangency to the record groove. As a small deviation from tangency begins to occur a very small "velocity" error is introduced which is necessary for a simple servo system to function. Skew (a deviation of the tone arm from a 90 degree relationship with the carriage guide 20, also meaning that there is a "velocity" error) is easily detected when the tone arm is mounted with freedom of motion in the horizontal plane. Thus, tone arm 16 is supported by horizontal pivots 88 (FIGURES 5 and 6) which are attached to yoke 90, the latter being capable of oscillations about a vertical axis as follows: yoke 90 has a vertical spindle 92 extending through an opening (FIGURE 6) in the bottom of carriage 22. Bearings 93, 94 (schematically shown) support spindle 92 for rotary oscillation. Thus, tone arm 16 can pivot up and down (in a vertical plane) about bearings 88, and can pivot horizontally about the axis of spindle 92. As a part of the brake, wheel 84 is mounted for free rotation at the end of an arm 96 which is secured to and which projects laterally from spindle 92. The structural arrangement of the brake and its relationship to spindle 92 is such that the brake effort and reaction from member 78 are transmitted to carriage 22 by way of arm 96 and pivot 92. In this way tone arm 16 is isolated from the reaction forces of braking. This is most important for high quality performance. As the brake is engaged and disengaged, there is only a very slight rolling action of wheel 84 on the adjacent surfaces of members 78, 80.

FIGURE 7 shows a modification of my brake where shaft **72*a* has brake 78*a* formed with teeth 100 on one face thereof. Thus, arm 96*a* has a dog 84*a* at the end thereof which engages teeth 100** to stop the motor in response to horizontal angular motion of the tone arm in one direction, and to release the motor during angular motion in the other direction.

FIGURE 8 shows another modification of the brake where teeth **100*b* are on the surface of brake member 78*b* instead of on the face thereof. Thus, dog 84*b* is located and designed to engage teeth 100*b***.

If tooth-brake is desired, those of FIGURES 7 and 8 can be used, or I can provide serrations or shallow teeth on the surface of member 78 (FIGURE 4) and substitute a thin plastic or metal disc for wheel 84.

FIGURES 9 and 10 show a non-contacting brake which eliminates any possibility of even the most delicate mechanical noise which may be experienced with the mechanical brakes of FIGURES 7 and 8. My non-contacting brake is eddy current coupling made of a conducting disc **78*c* which can, for instance, be attached to shaft 68 (or pinion 60) in place of crown gear 66. Permanent magnet 86*c* is secured to arm 96*c* so that as the tone arm 16 begins to skew, the disc 76*c* is immersed to a greater or lesser extent in the flux field between the poles of magnet 86*c***.

The preceeding description is given by way of example only. Various modifications may be made. For example in FIGURE 6 I have shown magnet 106 on guide 20 and an iron piece 107 on the top of tone arm 16, to act as a latch to hold the tone arm in an elevated position. A mechanical latch could just as easily have been used. The latch is a convenience to hold the stylus-end of the tone arm elevated above the record, and it serves another useful purpose. Should the carriage be moved to the right (thereby winding the spring of the motor) and the carriage handle 46 is manually released the motor will immediately begin to operate. But, if tone arm 16 is lifted and latched by magnet 106 in a position at which the brake is engaged, the motor will not operate until the tone arm is either horizontally moved to a position at which the brake is disengaged or until normal playing motion of the arm causes the spring motor to operate.

I claim:

1. In a record player tone arm assembly, a guide, a tone arm support movably mounted on said guide; mechanical servo means to move the tone arm and support along a predetermined path as the tone arm stylus tracks the record groove; mechanical motor means to move said support and tone arm with respect to said guide to maintain said arm in a predetermined relationship to said support as the stylus tracks the groove, and said servo means being responsive to said predetermined position for exercising control over said mechanical motor means to eliminate skew between the arm and said support, said mechanical motor means including means to store mechanical energy in response to movement of said support in one direction relative to said guide, and means driven by said stored mechanical energy to move said support at a rate controlled by said servo means.

2. In a record player tone arm assembly for a record having a spiral groove, a track, a support mounted on said track for movement parallel to a diameter of the record, a tone arm provided with a stylus, means pivotally mounting said tone arm on said support to be pivotal in a plane parallel to the record and translated by said carriage in such a path that said stylus tracks the record groove in a manner to maintain tangency between the tone arm and the part of the record groove being tracked, mechanical servo means to maintain a predetermined angular relationship between the support and the tone arm, said mechanical servo means including a mechanical motor, means drivingly connecting said mechanical motor with said support to propel said support as said stylus tracks the groove, skew responsive means connected to said tone arm and said mechanical motor to control the speed of said motor when the tone arm begins to skew from said predetermined angular relationship, said skew responsive means including a member which is movable with said tone arm relative to said support, a rotary element actuated by said mechanical motor, a stationary surface adjacent to said rotary element, and a rotary brake wheel mounted on said member for rolling motion between said stationary surface and said rotary element depending on the skew angle to control said rotary element when said tone arm skews thereby braking said rotary element and the mechanical motor.

3. In a tone arm assembly for a grooved record, the combination of a tone arm having a stylus to track the record groove, means including a mechanical motor to move said tone arm in a manner such that arm deviation responsible for incipient arm-to-groove tracking errors are minimized, and brake means for said motor and reresponsive to said incipient deviations to eliminate said tracking errors, said motor being a spring motor which is wound when said tone arm moving means are manually moved in one direction and unwound to propel said tone arm moving means in the opposite, record-playing direction.

4. In a record player tone arm assembly, a guide, a tone arm support movably mounted on said guide; mechanical servo means to move the tone arm and support along a predetermined path as the tone arm stylus tracks the record groove; mechanical motor means to move said support and tone arm with respect to said guide to maintain said arm in a predetermined relationship to said support as the stylus tracks the groove, said servo means being responsive to said predetermined position for exercising control over said mechanical motor means to eliminate skew between the arm and said support, said mechanical motor means including a spring motor, and said control exercising means including a mechanical member responsive to tone arm skew to control the speed of said spring motor.

5. The subject matter of claim 4 wherein said memeber is a roller connected to said tone arm, said servo means including an element which is spun by said motor, a stationary surface adjacent to said element, and said roller adapted to move between said element and said surface to effect said control over said spring motor.

6. In a record player tone arm assembly for a record having a spiral groove, a track, a support mounted on said track for movement parallel to a diameter of the record, a tone arm provided with a stylus, means pivotally mounting said tone arm on said support to be pivotal in a plane parallel to the record and translated by said carriage in such a path that said stylus tracks the record groove in a manner to maintain tangency between the tone arm and the part of the record groove being tracked, mechanical servo means to maintain a predetermined angular relationship between the support and the tone arm, said mechanical servo means including a mechanical motor, means drivingly connecting said mechanical motor with said support to propel said support as said stylus tracks the groove, skew responsive means connected to said tone arm and said mechanical motor to control the speed of said motor when the tone arm begins to skew from said predetermined angular relationship, said skew responsive means including a member which is movable with said tone arm relative to said support, a rotary element actuated by said mechanical motor, a stationary surface adjacent to said rotary element, said member frictionally controlling said rotary element when said tone arm skews thereby braking said rotary element and the mechanical motor, said means drivingly connecting said mechanical motor with said support including a mechanical spring motor and a flexible member attached to said track and operatively connected with the spring motor in a manner such that said spring motor is wound when said tone arm support is moved in one direction with respect to said track and unwound to propel said support in the opposite, record-playing direction.

References Cited by the Examiner

UNITED STATES PATENTS

| | | | |
|---|---|---|---|
| 2,915,315 | 12/1959 | Rabinow | 274—23 X |
| 3,129,946 | 4/1964 | Rabinow | 274—23.1 |

NORTON ANSHER, *Primary Examiner.*

EVON C. BLUNK, *Examiner.*

C. B. PRICE, *Assistant Examiner.*